(12) United States Patent
Schnabel et al.

(10) Patent No.: US 11,472,350 B2
(45) Date of Patent: Oct. 18, 2022

(54) DECORATIVE ARRANGEMENT FOR AN INTERIOR LINING OF A MOTOR VEHICLE AND METHOD FOR PRODUCING SAME

(71) Applicant: HIB Trim Part Solutions GmbH, Bruchsal (DE)

(72) Inventors: Uwe Schnabel, Bruchsal (DE); Volker Sieber, Karlsbad (DE)

(73) Assignee: HIB Trim Part Solutions GmbH, Bruchsal (DE)

(*) Notice: Subject to any disclaimer, the term of this patent is extended or adjusted under 35 U.S.C. 154(b) by 11 days.

(21) Appl. No.: 16/872,530

(22) Filed: May 12, 2020

(65) Prior Publication Data

US 2020/0269773 A1 Aug. 27, 2020

Related U.S. Application Data

(63) Continuation of application No. PCT/EP2019/050265, filed on Jan. 7, 2019.

(30) Foreign Application Priority Data

Jan. 17, 2018 (DE) ...................... 10 2018 100 976.3

(51) Int. Cl.
*B60R 13/02* (2006.01)
*B32B 3/08* (2006.01)
(Continued)

(52) U.S. Cl.
CPC .......... *B60R 13/0256* (2013.01); *B32B 3/085* (2013.01); *B32B 3/30* (2013.01); *B32B 21/08* (2013.01); *B32B 21/14* (2013.01); *B32B 2255/08* (2013.01); *B32B 2451/00* (2013.01); *B32B 2605/00* (2013.01)

(58) Field of Classification Search
CPC ......... Y10T 428/22; B44C 1/26; B32B 3/085; B32B 3/30; B32B 21/08; B32B 21/14; B32B 2255/08; B32B 2451/00; B32B 2605/00; B60R 13/0256; B60R 13/0243
See application file for complete search history.

(56) References Cited

U.S. PATENT DOCUMENTS

| 4,220,681 A | 9/1980 | Narita |
| 2005/0006019 A1* | 1/2005 | Ratcliffe .................. B44C 1/26 156/64 |

FOREIGN PATENT DOCUMENTS

| CN | 106256543 A | 12/2016 |
| DE | 20 2004 021 271 | 6/2007 |
| EP | 3106300 A1 | 12/2016 |

OTHER PUBLICATIONS

Chinese Office Action dated Jun. 23, 2021 in corresponding Chinese Application No. 201980003960.4.
(Continued)

*Primary Examiner* — Catherine A. Simone
(74) *Attorney, Agent, or Firm* — Harness, Dickey & Pierce, P.L.C.

(57) ABSTRACT

A decorative arrangement for an interior lining of a motor vehicle has a carrier layer (20), a decorative layer (6) on the carrier layer (20), and a protective layer provided on the decorative layer (6). The decorative layer (6) is composed of a wood or wood veneer material. A metal structure (8) is provided on the decorative layer (6). The metal structure (8) is inlaid into the decorative layer (6).

6 Claims, 2 Drawing Sheets

(51) Int. Cl.
*B32B 3/30* (2006.01)
*B32B 21/08* (2006.01)
*B32B 21/14* (2006.01)

(56) References Cited

OTHER PUBLICATIONS

International Search Report (in English) and Written Opinion (in German) in corresponding PCT Application No. PCT/EP2019/050265 dated Mar. 9, 2019.

* cited by examiner

DECORATIVE ARRANGEMENT FOR AN INTERIOR LINING OF A MOTOR VEHICLE AND METHOD FOR PRODUCING SAME

CROSS-REFERENCE TO RELATED APPLICATIONS

This application is a continuation of International Application No. PCT/EP2019/050265, filed Jan. 7, 2019, which claims priority to German Application No. 10 2018 100 976.3, filed Jan. 17, 2018. The disclosures of the above applications are incorporating herein by reference.

FIELD

The disclosure relates to a decorative arrangement for an interior lining of a motor vehicle, having a carrier layer, a decorative layer provided on the carrier layer, and a protective layer provided on the decorative layer. The decorative layer is of a wood or wood veneer material. A metal structure is provided in the region of the decorative layer. The disclosure further relates to a method of producing such a decorative arrangement.

BACKGROUND

The interior lining of a motor vehicle determines, to a great extent, the impression obtained by a vehicle user in terms of value and functionality of the motor vehicle. Decorative arrangements for the dashboard or for door trim panels, in particular, offer the opportunity to customize the motor vehicle according to customer demands. For this purpose, a new decorative arrangement has been developed, that is also known as a "mesh" look. For this arrangement, a decorative layer is produced from a wood or wood veneer material. A metal structure, ideally composed of narrow metal strips, is provided in the decorative layer.

Such a decorative arrangement is known from DE 20 2004 021 271 U1. Here a metal structure is applied to a wood material and bonded to the wood material by a protective layer. It should be clear that with a production method of this type, although the two materials can be attached to one another, a precise, high-quality, uniform overall impression cannot be produced. Moreover, even the smallest inclusions of the protective layer with the wood layer can result in undesirable irregularities. The number of different metal structure designs is also severely limited due to the required embodiment of the metal structure as a wire mesh. Furthermore, to process such a wire mesh a minimum thickness of the wire in the millimeter range must be ensured.

SUMMARY

It is therefore an object of the disclosure to provide a simple and cost-effective decorative arrangement and a method for producing such a decorative arrangement that avoids the aforementioned disadvantages.

This object is achieved by a decorative arrangement where the metal structure is inlaid in the decorative layer. In this way, a true composite of the metal structure with the wood or wood veneer material is produced. In a particularly advantageous manner, the metal structure is constructed from metal strips. The strips have a maximum width of 0.5 mm, preferably of 0.2 mm.

To ensure particularly high flexibility with respect to the configuration of the metal structure, the metal structure may be produced from a metal paste.

Advantageously, the carrier layer is produced at least partially from plastic. The protective layer is advantageously produced from a transparent lacquer.

Since the side of the decorative layer that faces away from view features a lamination, the decorative layer can be deformed particularly easily to adapt the layer to specific interior lining parts. On the visible side, the decorative layer can advantageously have a lacquer layer.

The object is likewise achieved by a method of producing such a decorative arrangement. In a first step, a decorative structure is molded injection-compression molding into the decorative layer. The decorative layer is placed in an injection-compression molding tool. On the side facing away from view, an injection pressure is generated by liquid plastic. This molds a desired decorative structure into the decorative layer. After curing, the plastic forms the carrier layer. In a second step, the decorative structure is filled with a metal paste. In a third step, the decorative layer, with the metal structure, is machined to the desired size. In a fourth step, the protective layer is applied to the decorative layer with metal structure.

With a method of this type, particularly narrow metal strips and ornaments of the metal structure can be produced. The minimum width may be about 0.2 mm, for instance.

Advantageously, the decorative layer can be reshaped into a 3D geometry prior to the first step.

It may also be advantageous for the overmolded parts of the decorative layer to be removed prior to the second step.

This ensures particularly sharp edges. It is also possible for the decorative layer to be treated by grinding, staining, and/or sealing after the removal of the overmolded parts. Particularly advantageously, the injection-compression molding tool has a depth contour $T_{WK}$, with $T_{WK} > T_{SDK}$, that corresponds to the desired depth contour of the decorative structure.

In this way, overmolded parts are produced over the entire surface of the decorative structure. Thus, this ensures clear, sharp edges.

Further areas of applicability will become apparent from the description provided herein. The description and specific examples in this summary are intended for purposes of illustration only and are not intended to limit the scope of the present disclosure.

DRAWINGS

The disclosure will be described in greater detail with reference to the set of drawings.

DETAILED DESCRIPTION

Figure 1:
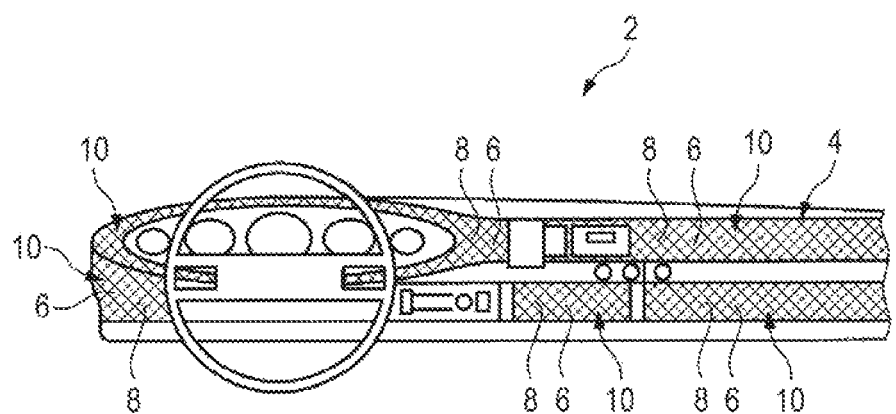
FIG. 1 is a schematic front view of a motor vehicle dashboard with a decorative arrangement.

FIG. 1 shows a schematic view of a dashboard 2, known per se, with a decorative arrangement 4 according to the disclosure. This has what is known as a "mesh" look. For this purpose, a metal structure 8 is inlaid into a decorative layer 6. The decorative layer 6 is composed of a wood veneer material. The metal structure 8, in this case, is constructed of metal strips with a minimum width of 0.2 mm. The metal structure 8 is produced using a metal paste 22 (see FIG. 3), known per se, by filling a decorative structure 10 with injection-compression molded grooves 11 (see in particular FIG. 2).

Figure 2:
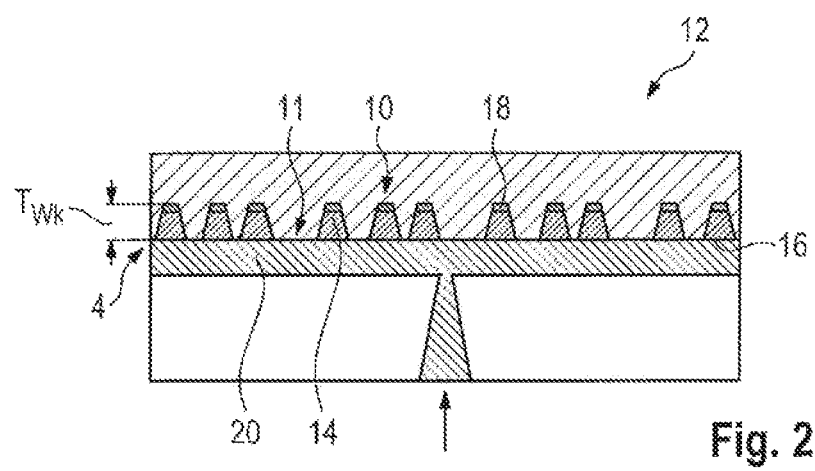
FIG. 2 is a cross-section schematic view of an injection-compression molding tool where a decorative arrangement has been placed.

FIG. 2 shows a schematic view of the decorative arrangement 4 in an injection-compression molding tool 12. As described above in reference to FIG. 1, the decorative arrangement 4 has a decorative layer 14 made of a wood veneer material. On the side facing away from view, the decorative layer 14 has a lamination 16, in a known manner. On the visible side, a lacquer layer 18 is provided on the decorative layer. The lacquer layer 18 is intended, in particular, to prevent the decorative layer 14 from becoming soiled during filling of the grooves 11 with the metal paste 8.

In the method for producing the decorative arrangement 4, the described decorative layer 14 is placed in the injection-compression molding tool 12. The side of the decorative layer 14 that faces away from view, that is provided with the lamination 16, is acted on by an injection pressure of a liquid plastic. This molds the desired decorative structure 10, including the grooves 11, into the decorative layer 14. Once the injected plastic cures, it forms a carrier layer 20 for the decorative arrangement 4. To have a desired 3D geometry, it is advantageous for the decorative layer 14 to be reshaped prior to the described first step. The injection-compression molding tool 12 should have a depth contour $T_{WK}$ that is greater than a desired depth contour $T_{SWK}$ of the grooves 11 of the decorative structure. This will ensure that overmolding occurs over the entire region of the decorative structure 10. This will be eliminated in a subsequent removal process in order to obtain the sharpest possible edges of the grooves 11. Thus, ensuring an accurate and precise view of the metal structure 8. For this purpose it is possible, but not necessary, for overmolded parts of the decorative layer 14 to be removed prior to the second step described in the next section.

Figure 3:
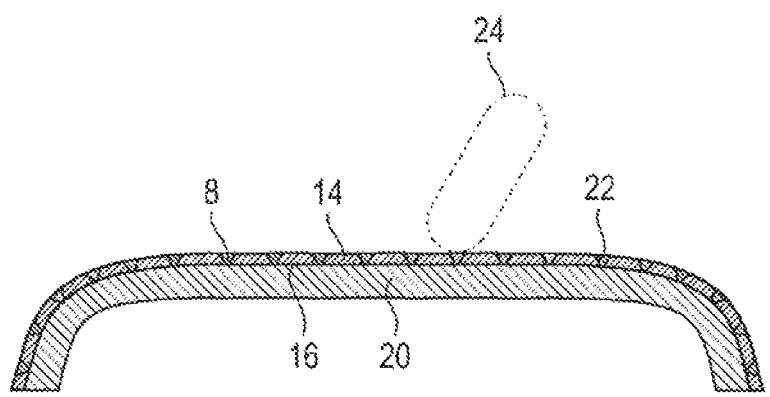
FIG. 3 is a cross-section schematic view of an injection-compression molded decorative arrangement with an inlaid metal structure.

In the second step, as shown in FIG. 3, the grooves 11 of the decorative structure 10 are then filled with a metal paste 22. In a third step, the decorative layer 14 with the metal structure 8 is machined to a desired target dimension. In this case, it is by a grinding tool 24. If desired, the applied lacquer layer 18 can be removed to the greatest extent possible to allow the decorative layer 14 to be treated by grinding, pickling, and/or sealing after the removal of the overmolded parts. This influences the coloring of the decorative layer. At the same time, of course, the gloss level of the metal structure 8 can also be influenced.

Figure 4:
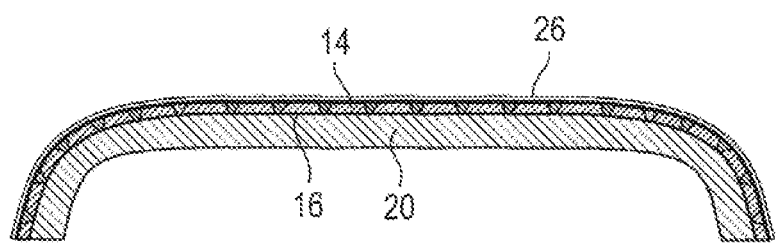
FIG. 4 is a cross-section schematic depiction of a decorative arrangement provided with a protective layer.

In the fourth and last step, as shown in FIG. 4, a protective layer 26, which in the present exemplary embodiment is a clear lacquer, is then applied to the decorative layer 14 with the metal structure 8.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A decorative arrangement for an interior lining of a motor vehicle comprising:
   a vehicle dash board or door panel including a plastic carrier layer;
   a decorative layer provided on the carrier layer;
   a protective layer provided on the decorative layer;
   the decorative layer further comprised of a wood or wood veneer material;
   a metal paste structure is provided on the decorative layer, the metal paste structure is inlaid into the decorative layer.

2. The decorative arrangement according to claim 1, wherein the metal paste structure provides metal strips with a maximum width of 0.5 mm.

3. The decorative arrangement according to claim 1, wherein the protective layer is produced from a transparent lacquer.

4. The decorative arrangement according to claim 1, wherein the decorative layer has a lamination facing away from view.

5. The decorative arrangement according to claim 1, wherein the decorative layer has a lacquer layer on a visible side.

6. The decorative arrangement according to claim 1, wherein the metal paste structure provides metal strips with a width of 0.2 mm.

* * * * *